United States Patent [19]

McCollum et al.

[11] Patent Number: 4,992,713
[45] Date of Patent: Feb. 12, 1991

[54] AIRCRAFT AUTOPILOT WITH YAW CONTROL BY RUDDER FORCE

[75] Inventors: James H. McCollum; Gary E. Forquer, both of Cedar Rapids, Iowa

[73] Assignee: Rockwell International Corporation, El Segundo, Calif.

[21] Appl. No.: 255,222

[22] Filed: Oct. 11, 1988

[51] Int. Cl.⁵ ............................................. B64C 13/18
[52] U.S. Cl. ..................................... 318/586; 318/580; 318/561; 244/17.13; 364/434
[58] Field of Search .................... 318/586, 580, 561; 364/434; 244/17.13

[56] References Cited

U.S. PATENT DOCUMENTS

| | | | |
|---|---|---|---|
| 4,030,011 | 6/1977 | Hendrick et al. | 318/561 |
| 4,082,238 | 4/1978 | Fabian et al. | 244/17.13 |
| 4,094,479 | 6/1978 | Kennedy, Jr. | 318/586 X |
| 4,492,907 | 1/1985 | Fabian et al. | 318/586 |
| 4,527,242 | 7/1985 | McElreath et al. | 364/434 |

OTHER PUBLICATIONS

"Automatic Control of Aircraft and Missiles", J. H. Blakelock, John Wiley & Sons, Inc., N.Y., N.Y., 1965, pp. 56, 57, 137–182.

Primary Examiner—William M. Shoop, Jr.
Assistant Examiner—Saul M. Bergman
Attorney, Agent, or Firm—Gregory G. Williams; M. Lee Murrah; H. Fredrick Hamann

[57] ABSTRACT

An autopilot with long term yaw coordination capabilities which utilizes lateral acceleration to generate a rudder force command which is combined with the sensed rudder force to create an error signal which is combined with a rudder servo velocity signal and then integrated to create a virtual rudder position feedback signal for combination with the rudder position commands, generated from yaw rate information.

5 Claims, 1 Drawing Sheet

AIRCRAFT AUTOPILOT WITH YAW CONTROL BY RUDDER FORCE

FIELD OF INVENTION

The present invention generally relates to aircraft flight controls; and more particularly concerns autopilots for aircraft; and even more particularly relates to yaw damping automatic rudder controls which utilize rudder force commands.

BACKGROUND

In recent years, the cockpits of modern aircraft have become increasing crowded with complex avionics equipment, which provide the flight crew with much needed information, while concomitantly requiring increased crew attention. Consequently, it is quite beneficial to provide automatic control systems, for relieving some of the pilots many inflight tasks. Autopilots, which automatically manage the aircraft control surfaces, are typically some of these automatic systems.

In the past, autopilot systems have provided for short term yaw damping by controlling rudder position. These prior art systems typically used a gyro to generate yaw rate information, which would then be converted into a rudder position command signal and then applied to the rudder, in combination with a rudder position feedback loop.

While these systems, or variations of them, have been extensively used for yaw damping, they do have numerous serious drawbacks. One particular problem, is that the long term yaw coordination has been typically left to the pilot. Furthermore, the steps that the pilot would take to correct the long term yaw coordination would typically involve trimming the aircraft. These steps frequently would be opposed by the short term yaw damping and rudder servo position feedback of the automatic pilot. As a result, pilots frequenly would disengage the automatic pilot, trim the aircraft, and then reengage the automatic pilot with the new trim configuration. This digengaging and reengaging causes unwanted distractions in the cockpit.

Consequently, a great need exists for improvement in autopilot systems which assists in the control of yaw of the aircraft, for both short term yaw and long term yaw coordination, without opposing any pilot initiated rudder adjustments.

OBJECT OF THE INVENTION

It is an object of the present invention to provide an autopilot which controls the yaw of the aircraft and further reduces some of the pilots many inflight tasks.

It is a feature of the present invention to include a long term yaw coordination control signal which controls the rudder force.

It is a advantage of the present invention to allow the pilot to trim the aircraft, free from opposition from the autopilot, without requiring the pilot to disengage and reengage the autopilot.

SUMMARY OF THE INVENTION

The present invention provides an autopilot with yaw control which is designed to satisfy the aforementioned needs. include the above described objects. contain the earlier articulated features and provide the previously stated advantages. The invention is carried out in a "disengageless" system, in the sense that, the pilot is not required to disengage the autopilot, in order to trim the aircraft without opposition from the autopilot. Instead, the long term yaw is controlled by a lateral acceleration signal which produces a force command, which is combined with the typical force wash-out command, to allow for continued automatic yaw control while concomitantly allowing for pilot initiated trim adjustments, which are free of autopilot opposition.

Accordingly, the present invention includes an autopilot having a yaw control function which utilizes a lateral acceration signal to produce a rudder force controlling signal, which is then summed with the rudder force signal, that provides the normal yaw position control function with rudder force washout.

BRIEF DESCRIPTION OF THE DRAWINGS

The invention may be more fully understood by reading the following description of the preferred embodimsnts of the invention in conjunction with the appended drawings wherein.

DETAILED DESCRIPTION

Figure 1:
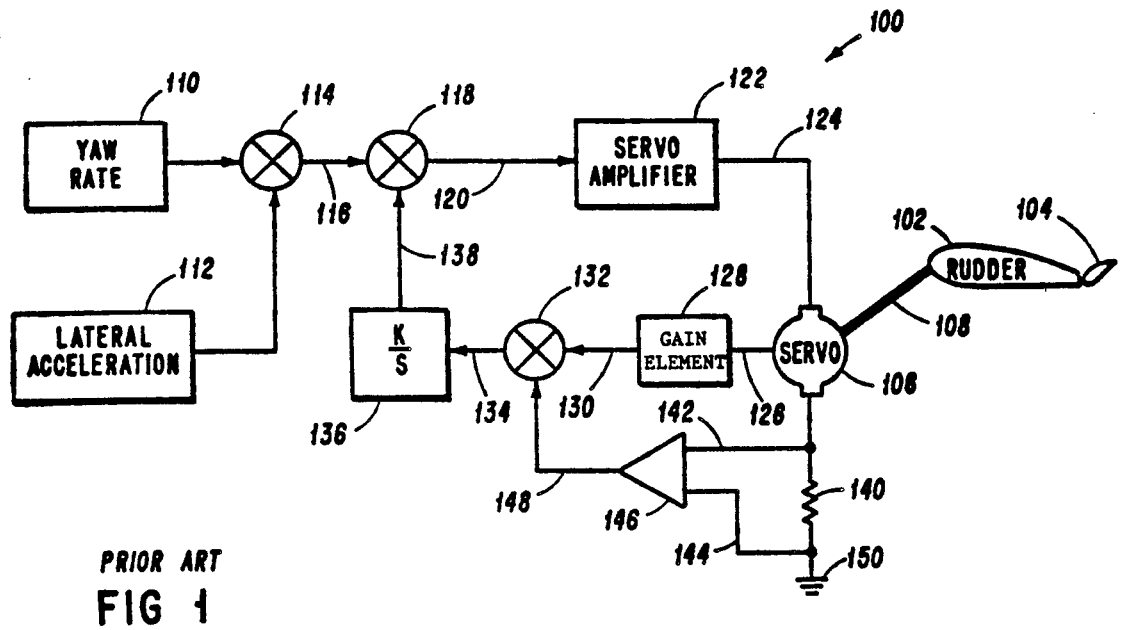
FIG. 1 is a schematic diagram of an autopilot system, of the prior art, which utilizes position commands through a servo-amplifier to control the rudder position, in order to damp the yaw of the aircraft. The lateral acceleration acceleration measurement is clearly shown as being incoporated into the position commands from the yaw rate gyro.

Now referring to the drawings, and more particularly to FIG. 1, there is schematically shown the yaw dampening controls laws for rudder control, of the prior art. An autopilot with yaw control, generally designated 100 is shown. The autopilot as shown, is designed to manipulate the rudder 102 having a trim tab 104 thereon, for controlling the yaw of the aircraft. Rudder 102 is coupled with drive servo 106 by mechanical linkage 108. Servo 106 is driven by signals received from sensors located elsewhere in the aircraft. The signals such as the yaw rate 110 and lateral aceleration 112, are combined at summing junction 114, which is connected through line 116 to summing junction 118, which continues through line 120 to servo amplifier 122. The signal on line 120 to the servo amplifier, 122 is the error signal between the desired rudder position, line 116 and the virtual rudder feedback position, line 138 due to integration of the servo velocity on line 126. Servo amplifier 122 outputs an analog signal along line 124, which is designated to be sufficient to control servo 106. Feedback of the rudder position is provided in the form of servo velocity along line 126 through a gain element 128, if necessary, which is connected through line 130 to summing junction 132 which continues on through line 134 to integrator 136 which converts the signal to rudder position and then through line 138 to summing junction 118 to be combined with the rudder position commamnd information along line 116. The position feedback is altered by a force wash-out function which limits the time that force will be held on the rudder, by the servo. This force wash-out function is accomplished by sensing the voltage drop between line 142 and line 144 which are on opposite ends of register 140, which is interposed between the servo 106 and a reference voltage 150. The current through the servo 106 is sensed by the voltage difference across resistor 140 by the differential amplifier 146 and a force command signal is output along line 148 to summing junction 132.

The prior art yaw control function of an autopilot would typically operates as follows:

The yaw rate 110 and the lateral acceleration 112 are combined at summing junction 114 to produce position commands. These position commands are evetually utilized to command the position of the rudder 102 while the feedback loop determines the relative position of the rudder by integrating the changes in the servo 106 and then supplying the virtual rudder the position information along line 138 back to summing junction 118. Rudder position, is phased with the yaw rate 110. That is, as a positive yaw rate occurs, the aircraft is turning in a clock wise direction, rudder is deflected in a positive direction, rudder trailing edge clockwise which controls the aircraft to turn, yaw in a counter clockwise direction thus arresting the original yaw rate clockwise rotation. Thus, the sensed yaw rate is employed to command a rudder deflection to stop the yaw rate. However, the feedback information on line 138 does not allow holding rudder force to remove the yaw out of trim condition. The yaw out of trim condition can occur by (1) manual rudder trim is not proper, i.e., the rudder tab, 104 is not properly positioned to remove the yaw mistrim condition; (2) an engine thrust deferential between the left and right engine can cause a yaw mistrim; (3) improper yaw coordination in a turn can cause a yaw mistrim. The yaw out of trim condition is sensed by the lateral accelerometer, 112. Rudder position is phased with the lateral acceleration, 112. That is, as a positive lateral acceleration occurs, the rudder is deflected in a positive direction, rudder trailing edge clockwise, into the air slip stream which requires a force to be held. The current through resistor 140 is a measurement of the torque, force being held by the servo, 106. The torque measured in resistor 140 is sensed by differential amlifier 146 and integrated by intergrator 136 thereby reducing the signal on line 120. The integration by integrator 136 of the sensed force by 140 continues to reduce the signal on line 120 until the signal on line 120 is zero resulting in the servo current in servo 106 to be zero, which stops the integrator, 136. Here, the integrator force feedback information on line 138 does not allow holding rudder force to maintain the aircraft to be trimmed by the lateral accelerometer. Here the lateral acelerometer implementation of FIG. 1, does not allow servo force to be held, it is washed out.

This inability of FIG. 1 to hold rudder force when a yaw mistrim occurs requires the pilot to need to manually trim the rudder, via tab 104, to properly remove the yaw out of trim of the airplane. The force-washout function produces by force a signal along line 148 that, over a long period of time, will remove all servo force from the rudder and thereby allow the pilot to manually trim the airplane.

If this rudder force wash out were not in the yaw control loop, then the pilot would not be able to properly perform rudder manual trim. However, such pilot input manual trim operations take a long time, as determined by the force washout, and become a major pilot workload.

Figure 2:
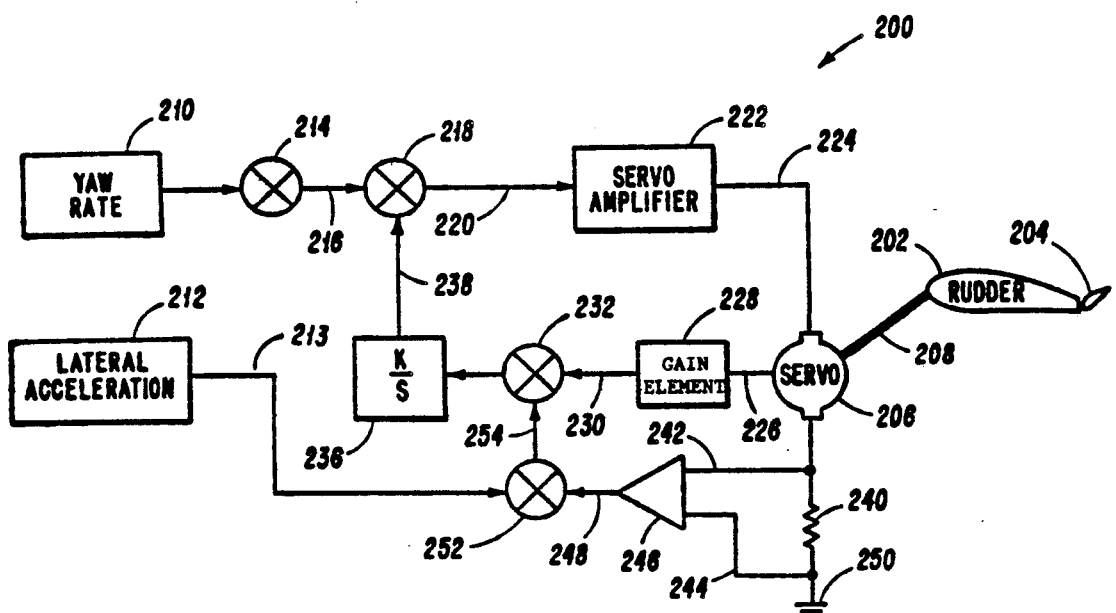
FIG. 2 is a schematic representation of the autopilot having yaw control, of the present invention, which clearly shows the lateral acceleration detection as being utilized to generate a force command which is summed with the force wash-out signal located in the rudder position feedback loop.

Now referring to FIG. 2, there is shown a yaw control apparatus, of the present invention, generally designated 200, which is designed to control the yaw of the aircraft by manipulating rudder 202 having trim tab 204 thereon. Rudder 202 is manipulated by servo 206 with the aid of the accompanying mechanical linkage 208. Servo 206 ultimately responds to the detection of yaw rate and lateral acceleration of the aircraft. The yaw rate 210 is provided through line 216 to summing junction 218 and then through line 220 to servo amplifier 222 which outputs an analog signal which ia compatible with the servo 206. The signal on line 216 is a rudder position command signal. The rudder 202 is manipulated in response to the rudder position command signal along line 216 as amplified by servo amplifier 222. Furthermore, feedback of the position of the rudder is provided to summing junction 218 through line 238. The information on line 220 to servo amplifier 222 is the error signal between the desired rudder position, and the virtual rudder feedback position line 238 due to integration of the servo velocity on line 226. Rudder position and the rudder feedback, is made up of the integrated summation of servo velocity and servo force along line 238. This signal is a virtual rudder positive feedback that provides for short term positioning of the rudder surface in response to the position commands on line 216 but in the long term will reduce the servo forces to those position commands of line 216 to zero.

The long term yaw control on the aircraft is achieved by detecting the lateral acceleration 212 and summing it with rudder servo force on line 248 in summing junction 252 to create a servo force command signal on line 254 which is summed with servo velocity signal 230 at summing junction 232.

In operation, if the airplane becomes out of trim in yaw the lateral accelerometer signal will command a rudder servo force proportional to the lateral acceleration signal and thereby reduce the free airplane effect of the yaw mistrim condition. The airplane will not be fully held in trim by the servo force and therefore the inclinometer of the instrument panel will indicate to the pilot the need to manually trim the trim tab 204. The rudder force signal from the lateral acceleration signal 212 is not in opposition to the pilots trimming efforts because: lateral acceleration is effectively displayed to the pilot by an instrument called an inclinometer. The pilot manually trims the airplane to "center the ball" in the inclinometer, and thereby reduces the lateral acceleration force command from the lateral accelometer to zero. Consequently the force signal of line 248 also will reduce to zero.

The lateral accelerometer in FIG. 2, can command a force to be held by the servo. That occurs by a yaw out of trim condition being sensed by the lateral accelerometer, 212. The lateral accelerometer outputs a signal to summing junction 252. The information at summing junction 252 is (1) lateral acceleration from accelerometer 212, and (2) servo torque, (force) sensed by differential amplifier 246 via the current servo, 206 flowing through the resistor differential amplifier, 240. the information on line 254 passes through summing junction 232 to the integrator, 236. The integrator integrates the difference of lateral acceleration and rudder servo forced contained contained on line 254 to produce a signal on line 238 which passes through summing junction 218 on to line 220 where it is amplified by the servo amplifier 222, which places a signal on line 224. The signal on line 224 produces a servo current, hence a rudder force. The servo current passes through resistor, 240 and is sensed by amplifier 246 and reduces the signal on line 254. The integrator will continue to integrate the difference signal at summing junction 252 until the signal on line 254 is zero. When the signal at line 254 is zero, then the rudder force signal on line 248 is equal and opposite to the lateral acceleration signal 213. Hence, FIG. 2, with its lateral accelerometer 212 can command rudder servo force.

It is thought that the yaw controlling apparatus of the present invention and many of its attendant advantages will be understood from the foregoing description, and will be apparent that various changes amy be made in the form, construction and arrangement of the parts thereof without departing from the spirit and scope of the invention or sacrificing all of their material advantages, the forms herein before described being merely preferred or exemplary embodiments thereof. It is the intention of the appended claims to cover all such changes.

I claim:

1. An autopilot system for controlling the yaw of an aircraft by manipulating the rudder comprising:
   (a) means for detecting yaw rate and generating a rudder position command in response to the detected yaw rate;
   (b) means for manipulating the rudder in response to the rudder position command;
   (c) means for detecting lateral acceleration and generating a rudder force signal in response thereto;
   (d) means for limiting the rudder force by providing a rudder force wash-out signal;
   (e) means for generating a rudder position feedback signal;
   (f) means for combining the rudder force signal with the rudder force wash-out signal, and further combining with rudder position feeback signal to create a rudder feedback virtual position signal;
   (g) means for summing the rudder feedback virtual position signal with the rudder position command.

2. An aircraft autopilot system, for controlling the yaw of an aircraft, said system of the type having; a servo amplifier for responding to rudder position commands, a servo which connects the servo amplifier and the rudder, a rudder position feedback loop which determines rudder position by integrating the servo velocity over time, the rudder position feedback loop also having a force wash out function which limits the time that the servo can hold force on the rudder, the force wash out function including a sensor for sensing a sensed rudder servo force applied by the servo to the rudder, at any given time, wherein the improvement in the aircraft autopilot system comprises:
   (a) means for generating a rudder force command signal in response to a lateral acceleration of the aircraft and means for combining the rudder force command signal with the sensed rudder servo force, to create a first error signal.

3. A system of claim 2 further comprising:
   (a) means for combining the first error signal with a rudder servo velocity signal.

4. A system of claim 3 further comprising;
   (a) means for integrating a second error signal produced from the combination of the error signal and the rudder servo velocity signal.

5. A method for operating an aircraft autopilot yaw control system comprising the steps of:
   (a) generating a rudder position command signal in response to a sensed yaw rate of the aircraft;
   (b) generating a rudder force command signal in response to a sensed lateral acceleration of the aircraft;
   (c) generating a rudder force sensed signal, which corresponds to the actual force on the rudder servo;
   (d) summing said rudder force command signal and said rudder force sensed signal to create a rudder force error signal;
   (e) generating a rudder servo velocity signal, which corresponds to the rudder servo velocity at any given time;
   (f) summing said rudder force error signal with said rudder servo velocity signal and then integrating the result to produce a virtual rudder position feedback signal; and
   (g) summing said rudder positon command signal with said virtual rudder position feedback signal.

* * * * *